G. S. Reynolds,
Clutch.

No. 113,566.        Patented Apr. 11, 1871.

Witnesses:
A. Bennewendorf
Wm. H. C. Smith

Inventor:
G. S. Reynolds
per Mmm &Co
Attorneys.

UNITED STATES PATENT OFFICE.

GEORGE S. REYNOLDS, OF LEBANON, NEW HAMPSHIRE.

IMPROVEMENT IN FRICTION-CLUTCHES.

Specification forming part of Letters Patent No. 113,566, dated April 11, 1871.

*To all whom it may concern:*

Be it known that I, GEORGE S. REYNOLDS, of Lebanon, in the county of Grafton and State of New Hampshire, have invented a new and Improved Friction-Clutch for Mowing-Machines; and I do hereby declare that the following is a full, clear, and exact description thereof, which will enable others skilled in the art to make and use the same, reference being had to the accompanying drawing, forming part of this specification, in which—

Figure 1:
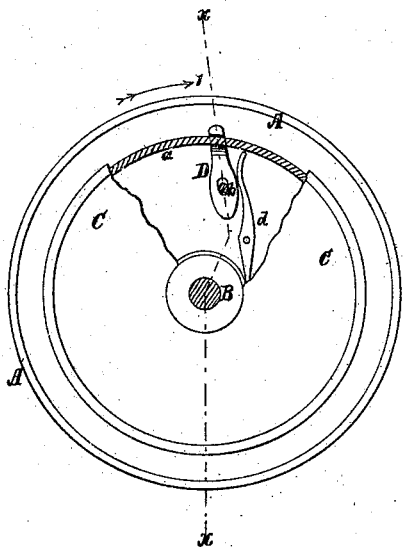
Figure 2:
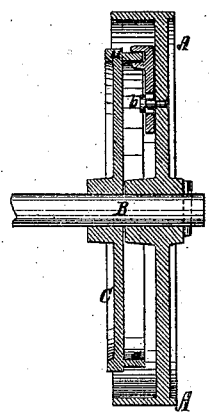

Figure 1 represents a face view, partly in section, of my improved friction-clutch. Fig. 2 is a transverse section of the same, taken on the plane of the line $x\,x$, Fig. 1.

Similar letters of reference indicate corresponding parts.

This invention relates to a new friction-clutch to be used on mowing and reaping machines, in place of the ordinary pawl-and-ratchet connection between the driving-wheel and the driving-axle.

The invention consists in the employment of a slotted pawl which has a grooved face that fits a projecting rim on the wheel to which it is to impart motion.

A in the drawing represents the driving-wheel of a mowing or reaping machine. B is the axle, upon which the wheel A is hung loose. C is a wheel mounted securely upon the axle B, and provided with a projecting rim or flange, $a$. D is the pawl or clutch. It is a lever pivoted by a pin, $b$, to the wheel A, and slotted where said pin passes through it, and provided with a grooved face, into which the rim $a$ of the wheel C is fitted, as shown.

A spring, $d$, presses against one side or edge of the pawl or clutch D, and tends to incline the same in such manner that it will firmly bite and grasp the rim $a$ when turned in the direction of the arrow 1, while it will slip quite loose on the same if turned in the opposite direction. This provides a noiseless and quite reliable connection between the driving-wheel and the axle, whereby the latter will be revolved during the forward, but not disturbed during the backward, motion of the mower or reaper.

One such clutch being attached to each driving-wheel, it will be seen that when the machine is turned to right or left the fastest-turning wheel will move the cutters, preventing them from becoming clogged.

Having thus described my invention, I claim as new and desire to secure by Letters Patent—

The clutch-lever D, slotted and grooved, and combined with the spring $d$ and with the flange of the wheel C, substantially as herein shown and described, to operate as set forth.

GEORGE S. REYNOLDS.

Witnesses:
F. A. CUSHMAN,
MARTIN BURK.